(12) United States Patent
Rao et al.

(10) Patent No.: US 12,373,068 B2
(45) Date of Patent: Jul. 29, 2025

(54) DISPLAY PANEL, DISPLAY APPARATUS, AND METHOD FOR MANUFACTURING DISPLAY PANEL

(71) Applicants: Hefei Visionox Technology Co., Ltd., Anhui (CN); KunShan Go Visionox Opto Electronics Co., Ltd, Jiangsu (CN)

(72) Inventors: Bo Rao, Hefei (CN); Xiaoxi Sun, Hefei (CN); Yuan Yao, Hefei (CN); Shizhen Feng, Hefei (CN)

(73) Assignees: Hefei Visionox Technology Co., Ltd., Hefei (CN); KunShan Go Visionox Opto Electronics Co., Ltd, Kunshan (CN)

( * ) Notice: Subject to any disclaimer, the term of this patent is extended or adjusted under 35 U.S.C. 154(b) by 0 days.

(21) Appl. No.: 18/677,094

(22) Filed: May 29, 2024

(65) Prior Publication Data
US 2025/0173028 A1    May 29, 2025

(30) Foreign Application Priority Data
Nov. 24, 2023  (CN) .......................... 202311605498.X

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/04164* (2019.05); *G06F 2203/04103* (2013.01)

(58) Field of Classification Search
CPC ...... H10K 59/40; H10K 69/88; H10K 59/122; H10K 59/873; H10K 59/65; G06F 3/041–047; G06F 2203/041–04114; G06F 2203/04111; G06F 3/0412; G06F 3/0446; G06F 3/0443; G06F 2203/04112; G06F 2203/04103; G06F 3/0445; G06F 3/044; G06F 3/04164; G06F 2203/04107
See application file for complete search history.

(56) References Cited

U.S. PATENT DOCUMENTS

2021/0066642 A1* 3/2021 Lee ...................... H10K 59/124

FOREIGN PATENT DOCUMENTS

| CN | 114664909 A | 6/2022 |
|---|---|---|
| CN | 115513264 A | 12/2022 |

* cited by examiner

*Primary Examiner* — Sanjiv D. Patel
(74) *Attorney, Agent, or Firm* — Maier & Maier, PLLC

(57) ABSTRACT

A display panel, a display apparatus, and a method for manufacturing a display panel, and the display panel includes a base plate, an isolation structure, and a touch layer. The isolation structure is provided on the base plate, and encloses and forms a plurality of isolation openings configured to partition the light-emitting layer to form partitioned light-emitting units. The isolation structure is provided with a light transmission opening, so that a light transmittance of the display panel can be increased. The touch layer is located on a side of the isolation structure away from the base plate, and includes a touch electrode and a virtual electrode spaced apart and insulated from each other, the virtual electrode and the touch electrode are spaced apart and insulated from each other, the virtual electrode includes a first virtual electrode at least partially located in the light transmission region.

20 Claims, 9 Drawing Sheets

DISPLAY PANEL, DISPLAY APPARATUS, AND METHOD FOR MANUFACTURING DISPLAY PANEL

CROSS REFERENCE TO RELATED APPLICATION

The present application claims priority to Chinese Patent Application No. 202311605498.X filed on Nov. 24, 2023, and titled "DISPLAY PANEL, DISPLAY APPARATUS, AND METHOD FOR MANUFACTURING DISPLAY PANEL", which is incorporated herein by reference in its entirety.

TECHNICAL FIELD

The present application relates to the field of display, and particularly to a display panel, a display apparatus, and a method for manufacturing a display panel.

BACKGROUND

An organic light emitting display (OLED) and a flat display apparatus based on a light emitting diode (LED) technology are widely used in various consumer electronic products such as mobile phones, TVs, notebook computers, and desktop computers due to advantages such as high image quality, power saving, a thin body, and a wide range of applications, becoming the mainstream in display apparatuses.

However, operational performance of current OLED display products needs to be improved.

SUMMARY

Embodiments of the present application provide a display panel, a display apparatus, and a method for manufacturing a display panel, aiming to improve operational performance of an OLED display product.

Embodiments of a first aspect of the present application provide a display panel having a display region and a light transmission region, and the display panel includes: a base plate; an isolation structure located on a side of the base plate, wherein the isolation structure encloses and forms an isolation opening and a light transmission opening, the isolation opening is located in the display region and is provided with a light-emitting unit, and the light transmission opening is located in the light transmission region; and a touch layer located on a side of the isolation structure away from the base plate, wherein the touch layer includes a first conductive layer and a second conductive layer which are stacked, the first conductive layer includes a touch electrode and a virtual electrode spaced apart and insulated from each other, the virtual electrode includes a first virtual electrode at least partially located in the light transmission region, the second conductive layer includes a first connection segment, and the first virtual electrode is connected to a blocking signal through the first connection segment.

According to implementations of the first aspect of the present application, the display panel has a non-display region arranged around at least part of the display region, and the display panel further includes: a blocking signal line, wherein at least a part of the blocking signal line is located in the non-display region, one terminal of the blocking signal line is connected to the first connection segment, and the other terminal is connected to the blocking signal; or, at least one of first virtual electrodes is provided adjacent to the non-display region, one terminal of the blocking signal line is electrically connected to the first virtual electrode, and the other terminal is connected to the blocking signal.

According to any of the previous implementations of the first aspect of the present application, the blocking signal line includes a first line located on the first conductive layer, at least one of the first virtual electrodes is provided adjacent to the non-display region, one terminal of the first line is connected to the first virtual electrode, and the other terminal is connected to the blocking signal.

According to any of the previous implementations of the first aspect of the present application, the blocking signal line includes a second line located on the second conductive layer, one terminal of the second line is connected to the first connection segment, and the other terminal is connected to the blocking signal.

According to any of the previous implementations of the first aspect of the present application, the blocking signal line is connected to a blocking signal of an integrated circuit.

According to any of the previous implementations of the first aspect of the present application, the blocking signal includes a fixed voltage signal.

According to any of the previous implementations of the first aspect of the present application, the fixed voltage signal is a ground voltage signal.

According to any of the previous implementations of the first aspect of the present application, the first conductive layer further includes a touch line, at least a part of the touch line is located in the non-display region, one terminal of the touch line is connected to the touch electrode, and the other terminal is connected to the integrated circuit According to any of the previous implementations of the first aspect of the present application, the blocking signal line and the touch line are separated on two sides of the display region.

According to any of the previous implementations of the first aspect of the present application, the first connection segment is connected to a plurality of first virtual electrodes in a same light transmission region, and/or the first connection segment is connected to first virtual electrodes located in a plurality of different light transmission regions.

According to any of the previous implementations of the first aspect of the present application, a plurality of first virtual electrodes distributed along a first direction are bridged through the first connection segment; and/or the virtual electrode further includes a second virtual electrode located in the display region, the first virtual electrode is bridged to the second virtual electrode through the first connection segment, and the second virtual electrode is electrically connected to the blocking signal.

According to any of the previous implementations of the first aspect of the present application, the plurality of first virtual electrodes distributed along the first direction are located in a same row.

According to any of the previous implementations of the first aspect of the present application, at least one of second virtual electrodes is in a same row as the first virtual electrodes along the first direction According to any of the previous implementations of the first aspect of the present application, the touch electrode includes a touch driving electrode and a touch sensing electrode, the second conductive layer includes a second connection segment extending along the first direction, a plurality of touch sensing electrodes distributed along the first direction are bridged through the second connection segment, a plurality of touch driving electrodes distributed along a second direction are electrically connected to each other within the first conductive layer, and the first direction intersects the second direction.

According to any of the previous implementations of the first aspect of the present application, the first conductive layer includes a third connection segment extending along the second direction, the plurality of touch driving electrodes distributed along the second direction are electrically connected to each other through the third connection segment, and an orthographic projection of the first connection segment on the base plate overlaps an orthographic projection of the third connection segment on the base plate.

According to any of the previous implementations of the first aspect of the present application, the touch electrode surrounds the virtual electrode.

According to any of the previous implementations of the first aspect of the present application, the first virtual electrode is located within the touch sensing electrode.

According to any of the previous implementations of the first aspect of the present application, orthographic projections of the touch electrode and the virtual electrode on the base plate are located outside an orthographic projection of the light transmission opening on the base plate.

According to any of the previous implementations of the first aspect of the present application, at least a part of the orthographic projections of the touch electrode and the virtual electrode on the base plate is located within an orthographic projection of the isolation structure on the base plate.

According to any of the previous implementations of the first aspect of the present application, the virtual electrode includes a third virtual electrode located in the display region and provided in suspension.

According to any of the previous embodiments of the first aspect of the present application, one or more first virtual electrodes are located in a same light transmission region.

According to any of the previous implementations of the first aspect of the present application, the display panel further includes: a light-emitting layer located on a side of the base plate and including the light-emitting unit located in the isolation opening; and a first electrode layer located on a side of the light-emitting layer away from the base plate.

According to any of the previous implementations of the first aspect of the present application, the first electrode layer includes a plurality of first electrodes provided at intervals, and the first electrode is electrically connected to the isolation structure.

According to any of the previous implementations of the first aspect of the present application, an orthographic projection of each of light-emitting units on the base plate is located within an orthographic projection of a corresponding first electrode on the base plate.

According to any of the previous implementations of the first aspect of the present application, the light-emitting unit is spaced apart from the isolation structure.

According to any of the previous implementations of the first aspect of the present application, the isolation structure includes a first layer and a second layer located on a side of the first layer away from the base plate, and an orthographic projection of the first layer on the base plate is located within an orthographic projection of the second layer on the base plate.

According to any of the previous implementations of the first aspect of the present application, the second layer includes a conductive material or an insulation material.

According to any of the previous implementations of the first aspect of the present application, the second layer includes a metal material, and materials of the first layer and the second layer are different.

According to any of the previous implementations of the first aspect of the present application, the isolation structure further includes a third layer located on a side of the first layer facing the base plate, and the orthographic projection of the first layer on the base plate is located within an orthographic projection of the third layer on the base plate.

According to any of the previous implementations of the first aspect of the present application, the display panel further includes a pixel definition layer located on the base plate, the pixel definition layer includes a pixel definition portion and a pixel opening enclosed and formed by the pixel definition portion, the light-emitting unit is located in the pixel opening, and the pixel opening is connected to the isolation opening.

According to any of the previous implementations of the first aspect of the present application, the isolation structure is located on a side of the pixel definition portion away from the base plate.

According to any of the previous implementations of the first aspect of the present application, the pixel definition portion is provided with an accommodation opening, and the isolation structure is located in the accommodation opening.

According to any of the previous implementations of the first aspect of the present application, the display panel further includes a pixel electrode, and the pixel electrode is exposed by the pixel opening.

According to any of the previous implementations of the first aspect of the present application, orthographic projections of the touch electrode and the virtual electrode on the base plate are located outside an orthographic projection of the pixel opening on the base plate.

Embodiments of a second aspect of the present application provide a display panel having a display region and a light transmission region, and the display panel further includes: a base plate; an isolation structure located on a side of the base plate, wherein the isolation structure encloses and forms an isolation opening and a light transmission opening, the isolation opening is located in the display region and is provided with a light-emitting unit, and the light transmission opening is located in the light transmission region; and a touch layer located on a side of the isolation structure away from the base plate, wherein the touch layer includes a first conductive layer and a second conductive layer which are stacked, the first conductive layer includes a touch electrode and a virtual electrode spaced apart and insulated from each other, and the first conductive layer includes a plurality of virtual electrodes, at least one of the plurality of virtual electrodes overlaps the light transmission region, the second conductive layer includes a first connection segment, and the plurality of virtual electrodes are bridged through the first connection segment.

According to implementations of the second aspect of the present application, the plurality of virtual electrodes include a first virtual electrode located at least partially in the light transmission region and a second virtual electrode located in the display region, and the first virtual electrode and the second virtual electrode are bridged through the first connection segment; and/or, the plurality of virtual electrodes include a plurality of first virtual electrodes, at least a part of each of the first virtual electrodes is located in the light transmission region, and the plurality of first virtual electrodes are bridged through the first connection segment.

According to any of the previous implementations of the second aspect of the present application, the touch electrode includes touch sensing electrodes arranged along a first direction and touch driving electrodes arranged along a second direction, the plurality of virtual electrodes bridged through the first connection segment are arranged along the first direction, and the first direction intersects the second direction.

According to any of the previous implementations of the second aspect of the present application, the plurality of virtual electrodes bridged through the first connection segment are respectively located within the touch sensing electrodes.

According to any of the previous implementations of the second aspect of the present application, the second conductive layer includes a second connection segment extending along the first direction, the touch sensing electrodes distributed along the first direction are bridged through the second connection segment, and the touch driving electrodes distributed along the second direction are electrically connected to each other within the first conductive layer.

Embodiments of a third aspect of the present application provide a display apparatus including the display panel according to any of the above implementations and an integrated circuit located in a non-display region, and the integrated circuit is electrically connected to both the virtual electrode and the touch electrode.

The display panel according to the embodiments of the present application includes the base plate, the isolation structure, and the touch layer. The isolation structure is provided on the base plate, and encloses and forms a plurality of isolation openings configured to partition the light-emitting layer to form partitioned light-emitting units, so that a crosstalk among carriers in the light-emitting layer is reduced, a display effect of the display panel is improved, and it is not necessary to use the fine mask when the light-emitting units are manufactured, thereby reducing the development and use of the fine mask to reduce a manufacturing cost. The isolation structure is provided with the light transmission opening, so that a light transmittance of the display panel in the light transmission region can be increased. The touch layer is located on a side of the isolation structure away from the base plate and includes the touch electrode and the virtual electrode spaced apart and insulated from each other, the touch electrode is configured to achieve a touch function of the display panel, and the virtual electrode and the touch electrode are spaced apart and insulated from each other, that is, signals between the virtual electrode and the touch electrode are independent from each other. The virtual electrode includes the first virtual electrode at least partially located in the light transmission region, and a signal on the base plate would cause interference to the first virtual electrode through the light transmission opening, but the touch electrode and the virtual electrode are insulated from each other, so that the touch electrode is less interfered, and a touch performance of the touch electrode is improved. The virtual electrode and the touch electrode are located on the first conductive layer, the second conductive layer includes the first connection segment, the first virtual electrode is connected to the first connection segment through a via and is connected to the blocking signal through the first connection segment, so that the first virtual electrode has a fixed blocking signal. Under a condition that the first virtual electrode is interfered by a signal from the light transmission opening, the potential of the first virtual electrode is stable and is difficult to change, so that a problem that signal stability of the touch electrode is affected as a result of mutually coupled touch signals of the touch electrodes due to the potential change occurring after the first virtual electrode is interfered may be reduced. That is, mutual interference between a data signal of the base plate and the touch signal of the touch electrode through the light transmission opening is reduced, thereby improving the operational performance of the OLED display product.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals represent the same or similar features, and the accompanying drawings are not drawn to actual scale.

REFERENCE NUMERALS

Figure 1:
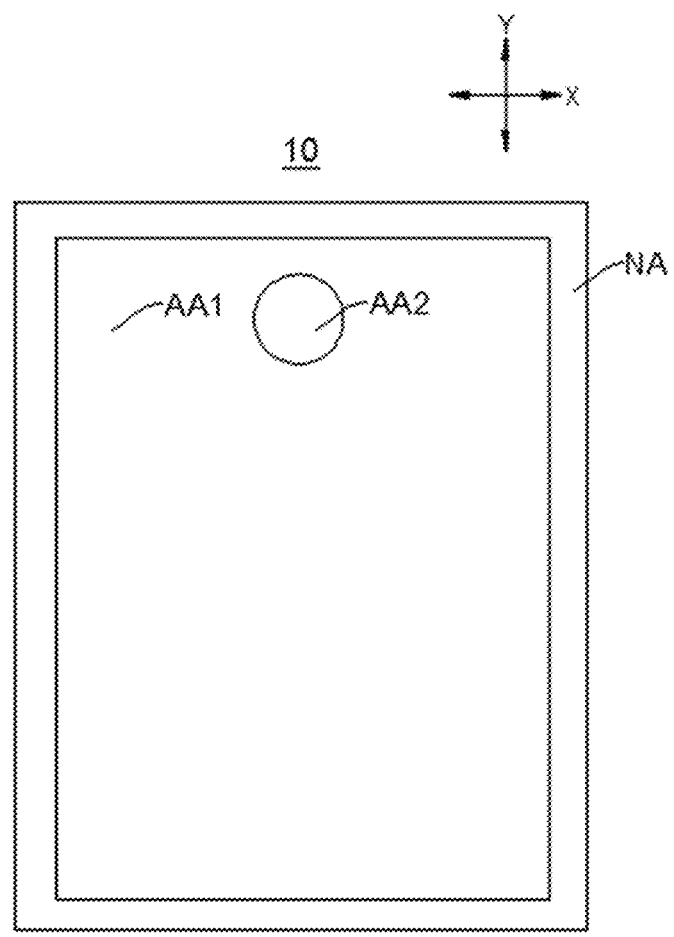
FIG. 1 is a schematic top view of a display panel according to an embodiment of the present application.

10: Display panel;
100: Base plate;
200: Isolation structure; 210: First layer; 220: Second layer; 230: Third layer; 240: Isolation opening; 250: Light transmission opening;
300: Touch layer; 310: First conductive layer; 311: Touch electrode; 312: Virtual electrode; 313: First virtual electrode; 314: Second virtual electrode; 315: Touch line; 316: Blocking signal line; 317: Third virtual electrode; 318: Touch driving electrode; 319: Touch sensing electrode; 320: Second conductive layer; 321: First connection segment; 322: Second connection segment;
400: Light-emitting layer; 410: Light-emitting unit;
500: First electrode layer; 510: First electrode;
600: Pixel definition layer; 610: Pixel definition portion; 620: Pixel opening; 630: Accommodation opening; 640: Pixel electrode;
700: Encapsulation layer;
800: Integrated circuit;
AA1: Display region; AA2: Light transmission region; NA: Non-display region;
X: First direction; Y: Second direction.

DETAILED DESCRIPTION

Features and exemplary embodiments of various aspects of the present application will be described in detail below.

In order to make the objectives, technical solutions, and advantages of the present application clearer, the present application will be further described in detail below with reference to the drawings and specific embodiments. It should be understood that the specific embodiments described herein are merely configured to explain the present application, rather than to limit the present application. For those skilled in the art, the present application can be implemented without some of these specific details. The following description of the embodiments is merely to provide a better understanding of the present application by illustrating the examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device comprising/including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be understood that when describing the structure of a component, if a layer/area is referred to as being "on" or "above" another layer/region, it may mean that the layer/area is directly on the other layer/region or that other layers/regions may be included between the layer/area and the other layer/area. Moreover, if the component is turned over, the layer/region will be "below" or "under" the other layer/region.

Embodiments of the present application provide a display panel, a display apparatus, and a method for manufacturing the display panel, and various embodiments of the display panel, the display apparatus, and the method for manufacturing the display panel will be described below with reference to the accompanying drawings.

The embodiments of the present application provide a display panel, and the display panel may be an organic light emitting diode (OLED) display panel.

Figure 2:
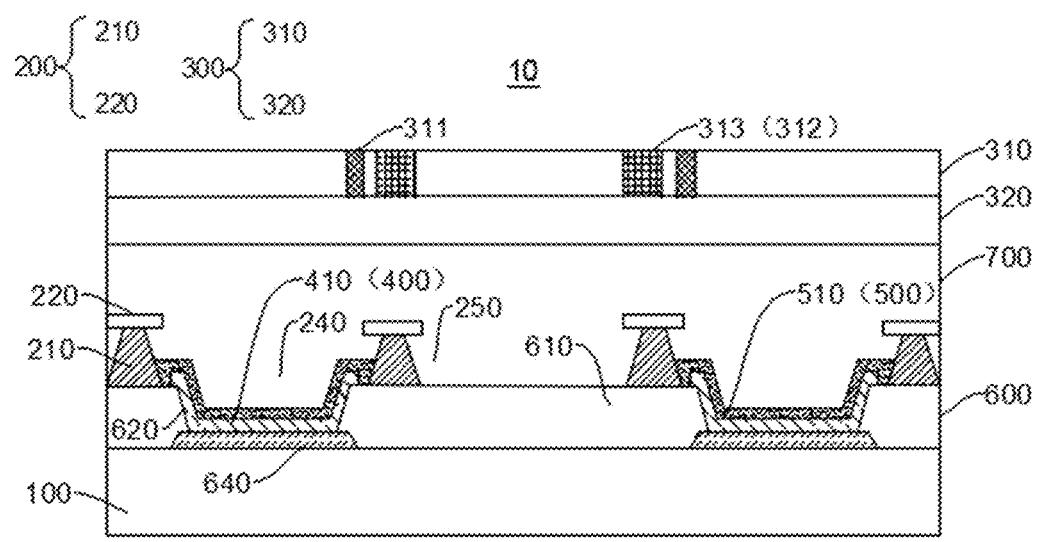
FIG. 2 is a partial cross-sectional view of a display panel according to an embodiment of the present application.
Figure 3:
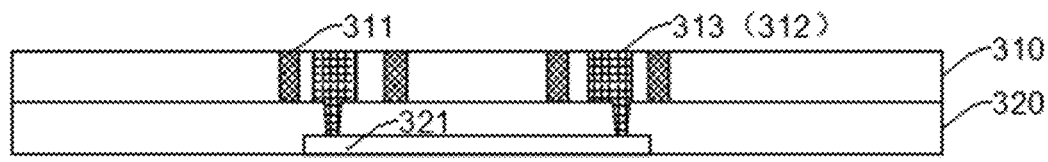
FIG. 3 is a partial cross-sectional view of a display panel in another embodiment.

Referring to FIG. 1 to FIG. 3, FIG. 1 is a schematic top view of a display panel according to an embodiment of the present application; FIG. 2 is a partial cross-sectional view of a display panel according to an embodiment of the present application; FIG. 3 is a partial cross-sectional view of a display panel in another embodiment.

As shown in FIG. 1 to FIG. 3, embodiments of a first aspect of the present application provide a display panel 10 having a display region AA1 and a light transmission region AA2, and the display panel 10 includes a base plate 100, an isolation structure 200, and a touch layer 300; the isolation structure 200 is located on a side of the base plate 100 and encloses and forms an isolation opening 240 and a light transmission opening 250, the isolation opening 240 is located in the display region AA1 and is provided with a light-emitting unit 410, and the light transmission opening 250 is located in the light transmission region AA2; and the touch layer 300 is located on a side of the isolation structure 200 away from the base plate 100 and includes a first conductive layer 310 and a second conductive layer 320 which are stacked, the first conductive layer 310 includes a touch electrode 311 and a virtual electrode 312 spaced apart and insulated from each other, the virtual electrode 312 includes a first virtual electrode 313 at least partially located in the light transmission region AA2, the second conductive layer 320 includes a first connection segment 321, and the first virtual electrode 313 is connected to a blocking signal through the first connection segment 321.

The display panel 10 according to the embodiments of the present application includes the base plate 100, the isolation structure 200, and the touch layer 300. The isolation structure 200 is provided on the base plate 100, and encloses and forms a plurality of isolation openings 240 configured to partition the light-emitting layer 400 to form partitioned light-emitting units 410, so that a crosstalk among carriers in the light-emitting layer 400 is reduced, a display effect of the display panel 10 is improved, and it is not necessary to use the fine mask when the light-emitting units 410 are manufactured, thereby reducing the development and use of the fine mask to reduce a manufacturing cost. The isolation structure 200 is provided with the light transmission opening 250, so that a light transmittance of the display panel 10 in the light transmission region AA2 can be improved. The touch layer 300 is located on a side of the isolation structure 200 away from the base plate 100 and includes the touch electrode 311 and the virtual electrode 312 spaced apart and insulated from each other, the touch electrode 311 is configured to achieve a touch function of the display panel 10, and the virtual electrode 312 and the touch electrode 311 are spaced apart and insulated from each other, that is, signals between the virtual electrode 312 and the touch electrode 311 are independent from each other. The virtual electrode 312 includes the first virtual electrode 313 at least partially located in the light transmission region AA2, and a signal on the base plate 100 would cause interference to the first virtual electrode 313 through the light transmission opening 250, but the touch electrode 311 and the virtual electrode 312 are insulated from each other, so that the touch electrode 311 is less interfered, and a touch performance of the touch electrode 311 is improved. The virtual electrode 312 and the touch electrode 311 are located on the first conductive layer 310, the second conductive layer 320 includes the first connection segment 321, the first virtual electrode 313 is connected to the first connection segment 321 through a via and is connected to the blocking signal through the first connection segment 321, so that the first virtual electrode 313 has a fixed blocking signal. Under a condition that the first virtual electrode 313 is interfered by a signal from the light transmission opening 250, the potential of the first virtual electrode 313 is stable and is difficult to change, so that a problem that signal stability of the touch electrode 311 is affected as a result of mutually coupled touch signals of the touch electrodes 311 due to the potential change occurring after the first virtual electrode 313 is interfered may be reduced. That is, mutual interference between a data signal of the base plate 100 and the touch signal of the touch electrode 311 through the light transmission opening 250 is reduced, thereby improving the operational performance of the OLED display product.

Optionally, a part of the isolation opening 240 is located in the light transmission region AA2, and the isolation opening 240 within the light transmission region AA2 is provided with the light-emitting unit 410, so that the light transmission region AA2 has a display function to achieve a full-screen display of the display panel 10.

The base plate 100 may be provided in various manners, for example, the base plate 100 may include a substrate and an array base plate provided on the substrate. Or, the base plate 100 is the substrate. Or, the base plate 100 includes a buffer layer and a support plate or the like on a side away from the substrate.

Optionally, the base plate 100 includes a data signal line for providing a data signal to a device of the display panel 10.

Figure 4:
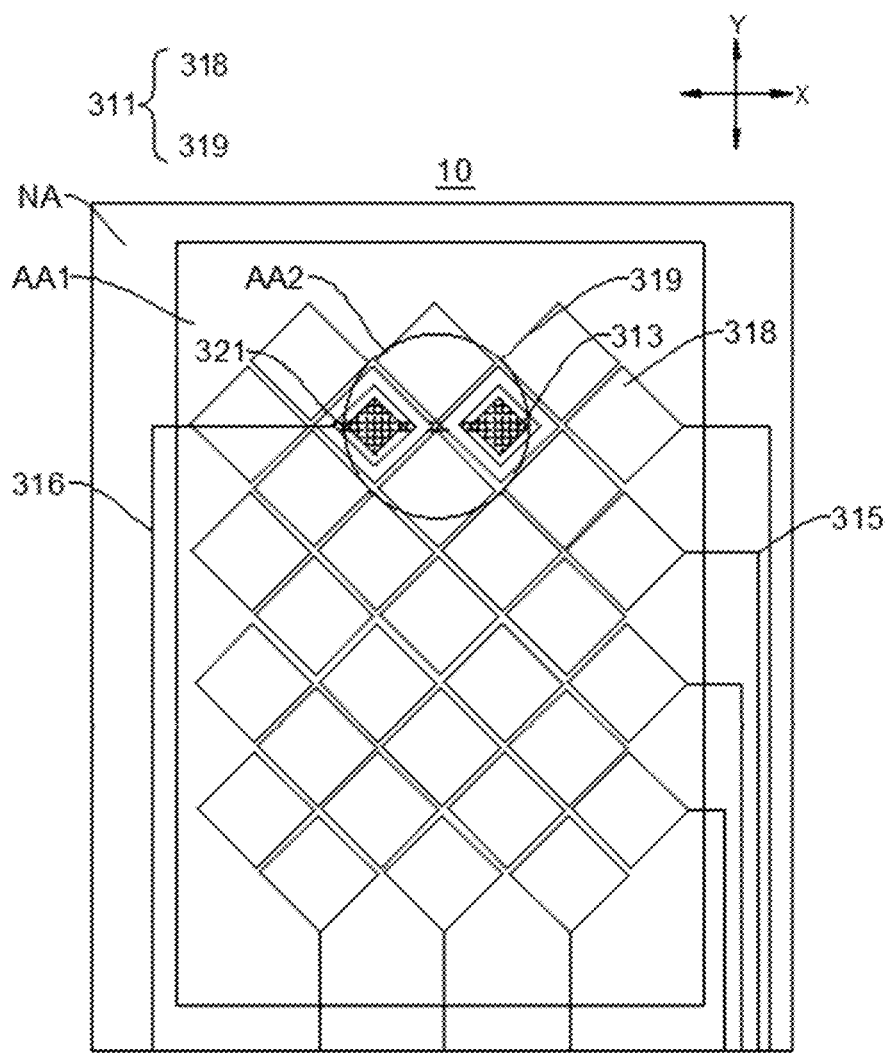
FIG. 4 is a schematic top view of a display panel in another embodiment.

Referring to FIG. 4, FIG. 4 is a schematic top view of a display panel in another embodiment.

As shown in FIG. 4, in some optional embodiments, the display panel 10 has a non-display region NA surrounding at least a part of the display region AA1 and further includes a blocking signal line 316, at least a part of the blocking signal line 316 is located in the non-display region NA, one terminal of the blocking signal line 316 is connected to the first connection segment 321, and the other terminal is connected to the blocking signal.

In these optional embodiments, at least a part of the blocking signal line 316 is located in the non-display region NA, so that an impact of the blocking signal line 316 on light-emitting of the display region AA1 is reduced to ensure to ensure a light-emitting effect of the display region AA1. One terminal of the blocking signal line 316 is connected to the first connection segment 321, and the other terminal is connected to the blocking signal, so that the first virtual electrode 313 can be connected to the blocking signal through the first connection segment 321, thereby ensuring that the first virtual electrode 313 has a stable fixed potential.

Optionally, at least one of the first virtual electrodes 313 is provided adjacent to the non-display region NA, and one terminal of the blocking signal line 316 is electrically connected to the first virtual electrode 313, and the other terminal is connected to the blocking signal. The first virtual electrode 313 provided adjacent to the non-display region NA can be directly electrically connected to the blocking signal line 316 to provide the blocking signal for the first virtual electrode 313.

In some optional embodiments, the blocking signal line 316 includes a first line located on the first conductive layer 310, at least one of the first virtual electrodes 313 is provided adjacent to the non-display region NA, one terminal of the first line is connected to the first virtual electrode 313, and the other terminal is connected to the blocking signal.

In these optional embodiments, the first virtual electrode 313 provided adjacent to the non-display region NA can be directly electrically connected to the first line to provide the blocking signal for the first virtual electrode 313, and both the first virtual electrode 313 and the first line are located on the first conductive layer 310 and can be directly overlapped, thereby simplifying the manufacturing process.

In some optional embodiments, the blocking signal line 316 includes a second line located on the second conductive layer 320, one terminal of the second line is connected to the first connection segment 321, and the other terminal is connected to the blocking signal.

In these optional embodiments, after the first virtual electrode 313 is connected to the first connection segment 321 through the via, the first connection segment 321 can be directly electrically connected to the second line to provide the blocking signal for the first virtual electrode 313, and both the first connection segment 321 and the second line are located on the second conductive layer 320, and can be directly overlapped, thereby simplifying the manufacturing process.

In some optional embodiments, the blocking signal line 316 is connected to a blocking signal of an integrated circuit.

In these optional embodiments, the integrated circuit provides the blocking signal for the first virtual electrode 313, so that the first virtual electrode 313 has the fixed blocking signal. Under a condition that the first virtual electrode 313 is interfered by the signal from the light transmission opening 250, the potential of the first virtual electrode 313 is stable and is difficult to change, so that the problem that signal stability of the touch electrode 311 is affected as a result of mutually coupled touch signals of the touch electrodes 311 due to the potential change occurring after the first virtual electrode 313 is interfered may be reduced.

Optionally, the blocking signal includes a fixed voltage signal, so that the first virtual electrode 313 has a fixed potential, which is relatively stable and is difficult to change after being interfered.

Optionally, the fixed voltage signal is a ground voltage signal. The integrated circuit provides the ground signal for the first virtual electrode 313, so that the first virtual electrode 313 achieves a ground connection, and after the touch signal or the data signal causes a charge disturbance to the first virtual electrode 313, coupled electrons generated by the first virtual electrode 313 can be released to ground, and the potential remains constant and not interfered. Accordingly, the touch signal and the data signal are difficult to interact through the first virtual electrode 313, so that the mutual interference between the touch signal and the data signal through the light transmission opening 250 is further reduced.

In some optional embodiments, the first conductive layer 310 further includes a touch line 315, at least a part of the touch line 315 is located in the non-display region NA, one terminal of the touch line 315 is connected to the touch electrode 311, and the other terminal is connected to the integrated circuit.

In these optional embodiments, at least a part of the touch signal line 315 is located in the non-display region NA, so that an impact of the touch signal line 315 on the light-emitting of the display region AA1 is reduced to ensure to ensure a light-emitting effect of the display region AA1. One terminal of the touch line 315 is connected to the integrated circuit, the other terminal is connected to the touch electrode 311, and the integrated circuit provides the touch signal for the touch electrode 311, so that the touch function of the touch electrode 311 is achieved.

In some optional embodiments, the blocking signal line 316 and the touch line 315 are separated on two sides of the display region AA1.

In these optional embodiments, the blocking signal line 316 and the touch line 315 are separated in the non-display region NA on two sides of the display region AA1, and both the blocking signal line 316 and the touch line 315 have relatively large wiring spaces to facilitate the wiring of the blocking signal line 316 and the touch line 315, so that problems of a mutual interference and a short circuit between the blocking signal line 316 and the touch line 315 which are caused by both the blocking signal line 316 and the touch line 315 located within the non-display region NA on one side of the display region AA1 are reduced. And it is difficult for a signal of the blocking signal line 316 and a signal of the touch line 315 to affect each other, so as to ensure the stability of the signal of the blocking signal line 316 and the signal of the touch line 315.

Figure 5:
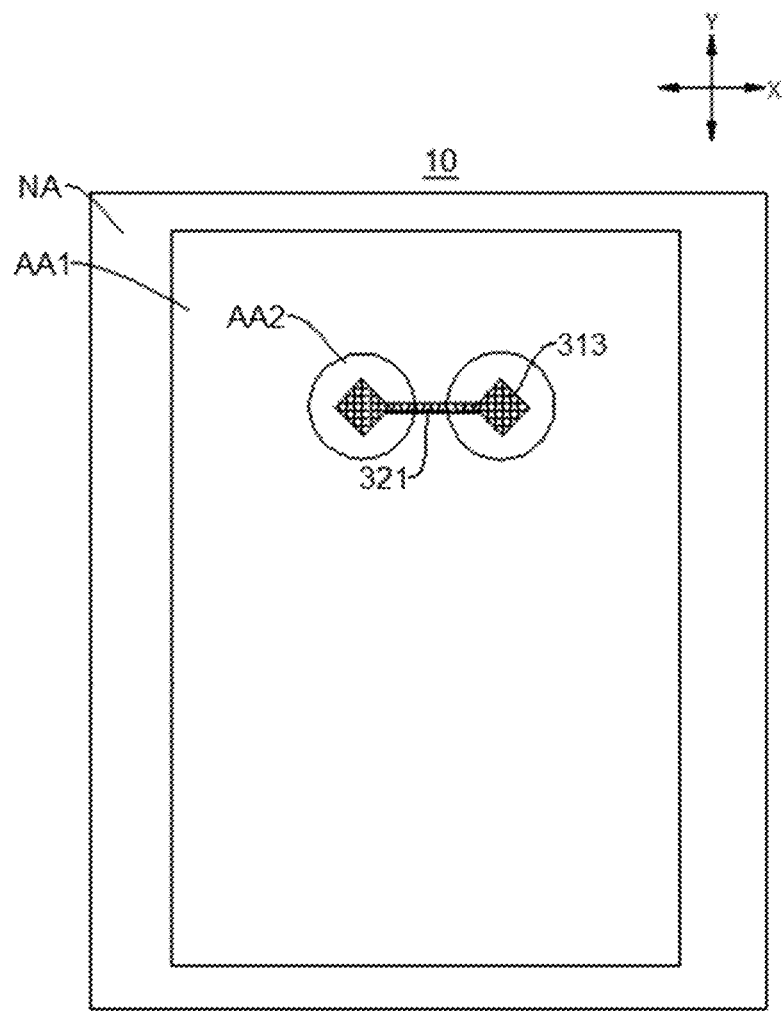
FIG. 5 is a schematic top view of a display panel in yet another embodiment.

Referring to FIG. 4 and FIG. 5 together, FIG. 5 is a schematic top view of a display panel in yet another embodiment, and in order to show some structures clearly, the touch electrode 311 and the like are not shown in FIG. 5.

In some optional embodiments, as shown in FIG. 4, the first connection segment 321 is connected to a plurality of first virtual electrodes 313 in a same light transmission region AA2, and/or, as shown in FIG. 5, the first connection segment 321 is connected to first virtual electrodes 313 located in a plurality of different light transmission regions AA2.

In these optional embodiments, the first virtual electrodes 313 are electrically connected as a whole, and after the plurality of first virtual electrodes 313 are connected to each other, only a single line is required to ground the first virtual electrodes 313 as a whole, thereby reducing the number of lines and simplifying the manufacturing process.

In some optional embodiments, one or more first virtual electrodes 313 are located in a same light transmission region AA2.

In these optional embodiments, an electrode in the touch layer 300 located in the light transmission region AA2 is the first virtual electrode 313. The light transmission region AA2 may be larger than the first virtual electrode 313, that is, the first virtual electrode 313 is entirely located within the light transmission region AA2. The light transmission region AA2 may be smaller than the first virtual electrode 313, that is, only a part of the first virtual electrode 313 is located within the light transmission region AA2.

Figure 6:
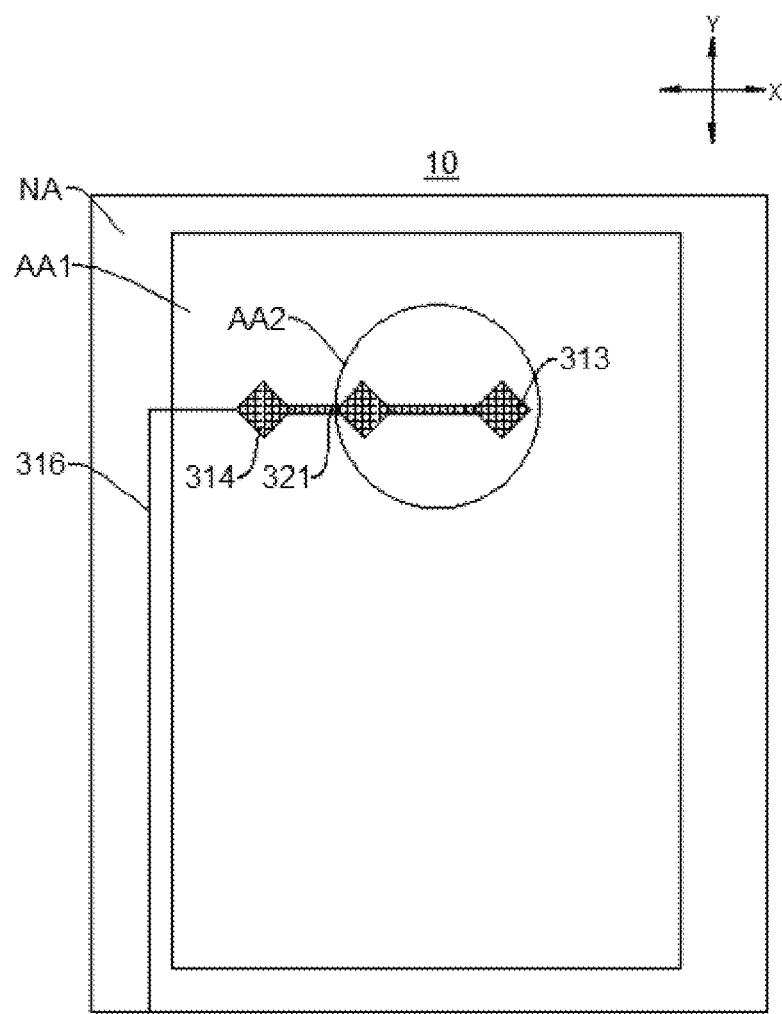
FIG. 6 is a schematic top view of a display panel in yet another embodiment.
Figure 7:
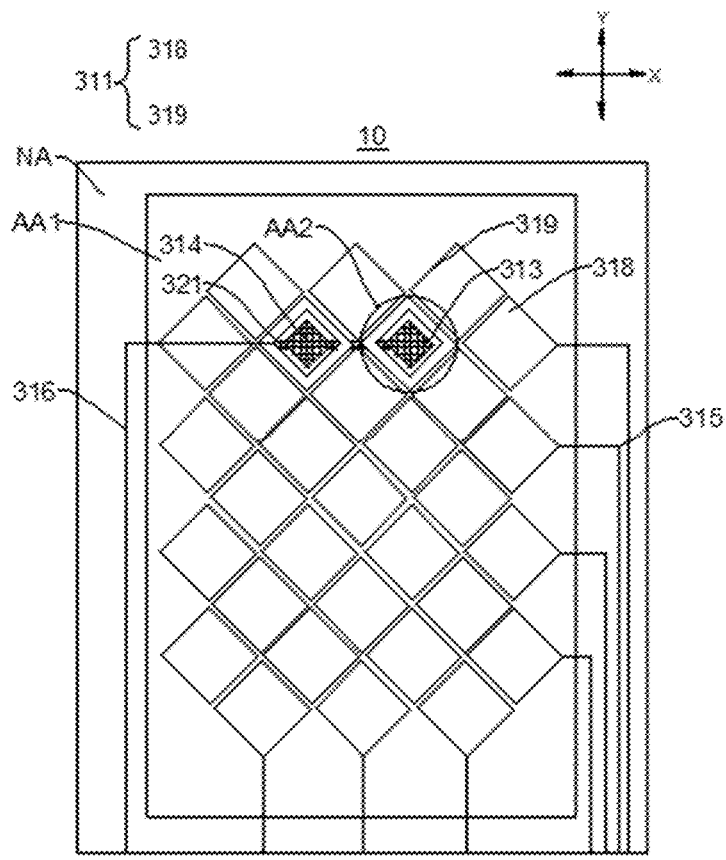
FIG. 7 is a schematic top view of a display panel in yet another embodiment.

Referring to FIG. 4, FIG. 6 and FIG. 7 together, FIG. 6 is a schematic top view of a display panel in yet another embodiment; FIG. 7 is a schematic top view of a display panel in yet another embodiment. In order to show some structures clearly, the touch electrode 311 and the like are not shown in FIG. 6.

In some optional embodiments, as shown in FIG. 4, a plurality of first virtual electrodes 313 distributed along a first direction X are bridged through the first connection segment 321; and/or, as shown in FIG. 6 and FIG. 7, the virtual electrode 312 further includes a second virtual electrode 314 located in the display region AA1, the first virtual electrode 313 is bridged to the second virtual electrode 314 through the first connection segment 321, and the second virtual electrode 314 is electrically connected to the blocking signal.

In these optional embodiments, the plurality of first virtual electrodes 313 are bridged as a whole through the first connection segment 321, or the first virtual electrode 313 is connected to the second virtual electrode 314 in the display region AA1 through the first connection segment 321, and then is electrically connected to the blocking signal through the second virtual electrodes 314. Since the second virtual electrodes 314 are distributed throughout the display region AA1, the connection of at least a part of the second virtual electrodes 314 to the blocking signal is easier than the connection of the first virtual electrodes 313 to the blocking signal, thereby reducing the manufacturing difficulty and simplifying the manufacturing process.

Optionally, the plurality of first virtual electrodes 313 distributed along the first direction X are located in a same row, so that the same row of first virtual electrodes 313 are connected along the first direction X, that is, the first connection segment 321 extends along the first direction X to reduce interference with other lines located in the second conductive layer 320 and extending along the first direction X.

Optionally, the at least one of second virtual electrodes 314 is in a same row as the first virtual electrodes 313 along the first direction X, and under a condition that the first virtual electrodes 313 are electrically connected to the blocking signal through the second virtual electrode 314, the first virtual electrodes 313 and the second virtual electrode 314 are located in the same row, so that the first connection segment 321 connecting the first virtual electrodes 313 to the second virtual electrode 314 extends along the first direction X to reduce interference with other lines located in the second conductive layer 320 and extending along the first direction X.

Figure 8:
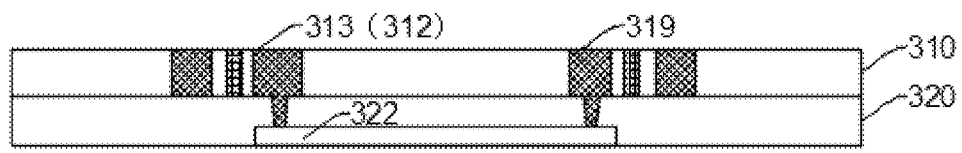
FIG. 8 is a partial cross-sectional view of a display panel in yet another embodiment.
Figure 9:
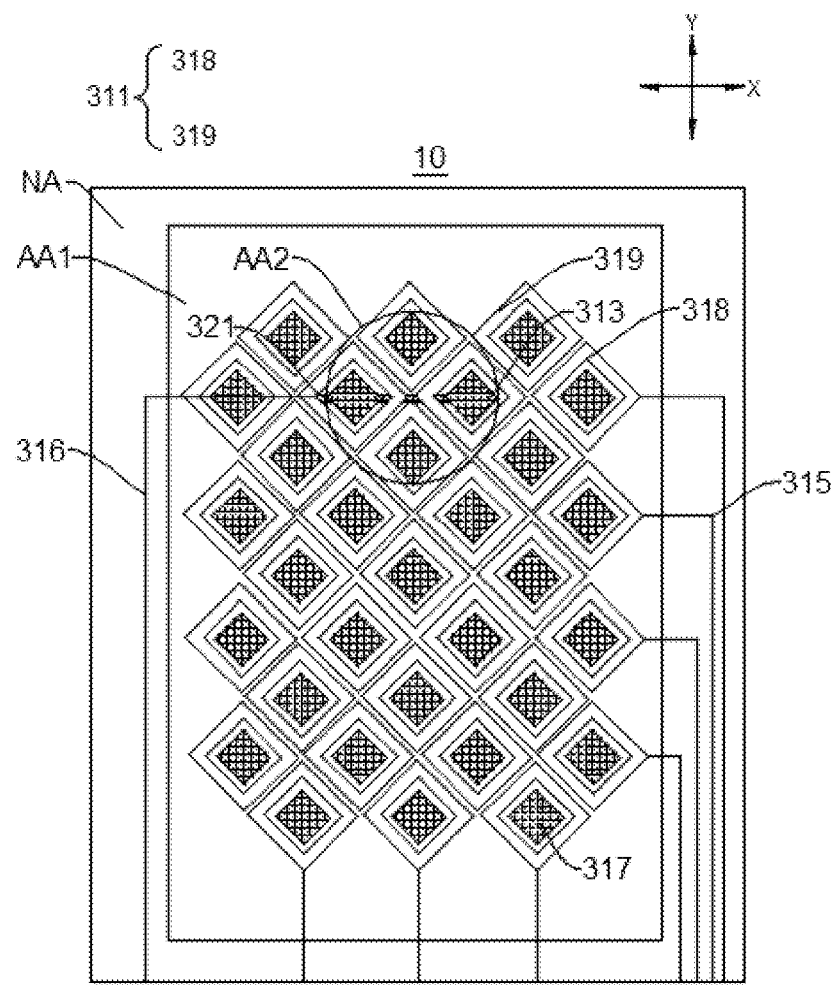
FIG. 9 is a schematic top view of a display panel in yet another embodiment.

Referring to FIG. 8 and FIG. 9 together, FIG. 8 is a partial cross-sectional view of a display panel in yet another embodiment; FIG. 9 is a schematic top view of a display panel in yet another embodiment.

As shown in FIG. 8 and FIG. 9, in some optional embodiments, the touch electrode 311 includes a touch driving electrode 318 and a touch sensing electrode 319, the second conductive layer 320 includes a second connection segment 322 extending along the first direction X, a plurality of touch sensing electrodes 319 distributed along the first direction X are bridged through the second connection segment 322, a plurality of touch driving electrodes 318 distributed along a second direction Y are electrically connected to each other within the first conductive layer 310, and the first direction X intersects the second direction Y intersect.

In these optional embodiments, the touch driving electrodes 318 and the touch sensing electrodes 319 are distributed along the first direction X and the second direction Y to form a capacitive touch display panel 10.

In some optional embodiments, the first conductive layer 310 includes a third connection segment extending along the second direction Y, the plurality of touch driving electrodes 318 distributed along the second direction Y are electrically connected to each other through the third connection segment, and an orthographic projection of the first connection segment 321 on the base plate 100 overlaps an orthographic projection of the third connection segment on the base plate 100.

In these optional embodiments, one terminal of the first connection segment 321 is connected to the first virtual electrode 313, and is connected across the touch driving electrode 318 to a first virtual electrode 313 located on the other side of the touch driving electrode 318.

Optionally, the touch electrode 311 surrounds the virtual electrode 312 and is provided between adjacent virtual electrodes 312, and the virtual electrodes 312 are bridged through a first connection segment 321 located on a different layer, so that first connection segments 321 do not interfere with the touch electrodes 311.

Optionally, the first virtual electrode 313 is located within the touch sensing electrode 319, that is, the touch sensing electrode 319 surrounds the first virtual electrode 313, so that the first virtual electrodes 313 and the touch sensing electrodes 319 are distributed along the same direction, the first connection segment 321 and the second connection segment 322 extend along the same direction, and thus the first connection segment 321 does not interfere with the second connection segment 322, thereby improving the reliability of the first connection segment 321 and the second connection segment 322.

In some optional embodiments, orthographic projections of the touch electrode 311 and the virtual electrode 312 on the base plate 100 are outside an orthographic projection of the light transmission opening 250 on the base plate 100.

In these optional embodiments, both the touch electrode 311 and the virtual electrode 312 are staggered with the light transmission opening 250 to prevent the touch electrode 311 and the virtual electrode 312 from blocking the light transmission opening 250, thereby ensuring a light transmittance of the light transmission opening 250.

Optionally, at least a part of the orthographic projections of the touch electrode 311 and the virtual electrode 312 on the base plate 100 is located within an orthographic projection of the isolation structure 200 on the base plate 100, so that a blocking of the light transmission opening 250 and other light transmission portions (such as the pixel definition portion 610) by the touch electrode 311 and the virtual electrode 312 is reduced, thereby improving an overall light transmittance of the display panel 10.

In some optional embodiments, the virtual electrode 312 includes a third virtual electrode 317 located in the display region AA1 and provided in suspension.

Providing the third virtual electrode 317 in suspension means that the third virtual electrode 317 is not connected to the other virtual electrodes 312, the touch electrodes 311 and lines, and is an independent structure without power supply.

In these optional embodiments, the third virtual electrode 317 is provided, so that the virtual electrodes 312 are provided across the display panel 10 to improve touch and display uniformity.

Figure 10:
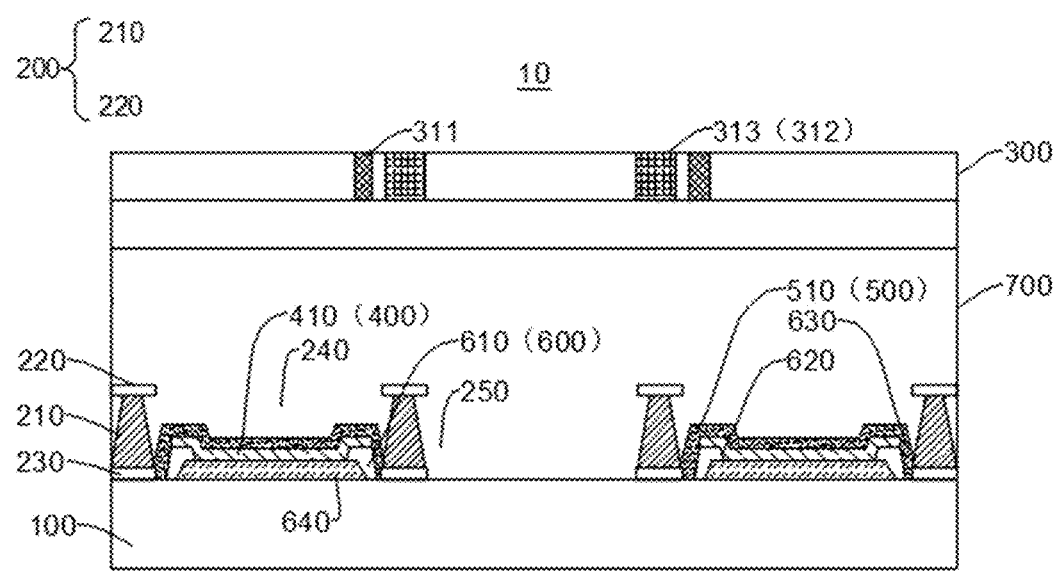
FIG. 10 is a partial cross-sectional view of a display panel in yet another embodiment.

Referring to FIG. 10, FIG. 10 is a partial cross-sectional view of a display panel in yet another embodiment.

As shown in FIG. 10, in some optional embodiments, the display panel 10 further includes a light-emitting layer 400 and a first electrode layer 500, the light-emitting layer 400 is located on a side of the base plate 100 and includes the light-emitting unit 410 located in the isolation opening 240; and the first electrode layer 500 is located on a side of the light-emitting layer 400 away from the base plate 100.

Optionally, the first electrode layer 500 includes a first electrode 510 located in the isolation opening 240, and the first electrode 510 is electrically connected to the isolation structure 200.

In these optional embodiments, isolation structures 200 partition the first electrode layer 500 to form first electrodes 510 provided at intervals, and the first electrodes 510 provided at intervals are electrically connected through the isolation structures 200 to form an entire electrode, thereby ensure normal light emission of the light-emitting unit 410.

In some optional embodiments, an orthographic projection of each of the light-emitting units 410 on the base plate 100 is located within an orthographic projection of a corresponding first electrode 510 on the base plate 100.

In these optional embodiments, the orthographic projection of the light-emitting unit 410 on the base plate 100 is located within the orthographic projection of the first electrode 510 on the base plate 100, that is, the first electrode 510 covers the light-emitting unit 410 and is used as an electrode of the light-emitting unit 410, thereby ensuring the normal light emission of the light-emitting unit 410 and improving the display effect of the display panel 10.

Optionally, the light-emitting unit 410 is spaced apart from the isolation structure 200, and the light-emitting units 410 and the isolation structures 200 are provided at intervals, that is, the light-emitting units 410 are provided at intervals, thereby reducing a crosstalk of carriers between the light-emitting units 410 and reducing a cross-color of the light-emitting units 410.

In some optional embodiments, the isolation structure 200 includes a first layer 210 and a second layer 220 located on a side of the first layer 210 away from the base plate 100, and an orthographic projection of the first layer 210 on the base plate 100 is located within an orthographic projection of the second layer 220 on the base plate 100.

In these optional embodiments, the first layer 210 and the second layer 220 are provided to form the isolation structure 200, an orthographic projection of a first layer 210 provided close to the base plate 100 on the base plate 100 is located within an orthographic projection of the second layer 220 on the base plate 100, an area of the second layer 220 is greater than an area of the first layer 210, and the second layer 220 covers a surface of the first layer 210 close to the second layer 220, under this condition the first layer 210 is recessed relative to the second layer 220 along a direction away from the isolation opening 240. When the light-emitting layer 400 is manufactured, the light-emitting layer 400 has a large drop along an edge of the isolation structure 200, and the first layer 210 is concaved relative to the second layer 220, so that it is difficult for the light-emitting layer 400 to be connected at the edge of the isolation structure 200, then a fracture happens, and thus the light-emitting layer 400 is fractured to form partitioned light-emitting units 410.

In some optional embodiments, the second layer 220 includes a conductive material or an insulation material.

In these optional embodiments, the second layer 220 includes a conductive material, for example, the second layer 220 includes a non-metal conductive material or a metal conductive material. Under a condition that the second layer 220 includes the non-metal conductive material or the insulation material, it is difficult to etch the second layer 220 during a process that wet etching is performed on the first layer 210 using an etching liquid, so that the first layer 210 is concaved more easily relative to the second layer 220.

In some optional embodiments, the second layer 220 includes a metal material, and materials of the first layer 210 and the second layer 220 are different.

In these optional embodiments, under a condition that both the first layer 210 and the second layer 220 include metal materials, wet etching may be performed on the first layer 210 using an etching liquid, and an etching rate of the second layer 220 may be less than an etching rate of the first layer 210 by providing the etching solution. Since the etching rate of the first layer 210 is relatively great, under a condition that the wet etching is performed using the etching liquid, the etching rate of the first layer 210 is greater even though certain etching is performed on the second layer 220, so that the first layer 210 is concaved relative to the second layer 220.

In some optional embodiments, the isolation structure 200 further includes a third layer 230 located on a side of the first layer 210 facing the base plate 100, and the orthographic projection of the first layer 210 on the base plate 100 is located within an orthographic projection of the third layer 230 on the base plate 100.

In these optional embodiments, in order to obtain the concaved first layer 210, the first layer 210 is etched in a greater etching rate than the second layer 220 and the third layer 230 when the etching is performed, so that the concaved first layer 210 is formed. Since the first layer 210 is etched in a relatively great etching rate, waste materials generated from the etching easily enter other locations in the display panel 10, thereby causing an adverse effect. After the third layer 230 is provided, the first layer 210 can adhere well to the third layer 230, and generated etching waste falls on the third layer 230 to facilitate cleaning.

In some optional embodiments, the display panel 10 further includes a pixel definition layer 600 located on the base plate 100, the pixel definition layer 600 includes a pixel definition portion 610 and a pixel opening 620 enclosed and formed by the pixel definition portion 610, the light-emitting unit 410 is located in the pixel opening 620, and the pixel opening 620 is connected to the isolation opening 240.

In these optional embodiments, the pixel opening 620 enclosed and formed by the pixel definition portion 610 is provided with the light-emitting unit 410 to achieve light-emitting and display of the display panel 10. The pixel opening 620 is connected to the isolation opening 240 to reduce the blocking of the pixel opening 620 by the isolation structure 200 and ensure the light-emitting effect of the light-emitting unit 410.

Optionally, the display panel 10 further includes a pixel electrode 640 exposed by the pixel opening 620, one of the pixel electrode 640 and the first electrode 510 is used as an anode of the light-emitting unit 410, and the other is used as a cathode of the light-emitting unit 410. The embodiments of the present application are exemplified in a way that the pixel electrode 640 is used as the anode of the light-emitting unit 410 and the first electrode 510 is used as the cathode of the light-emitting unit 410.

In some optional embodiments, the isolation structure 200 is located on a side of the pixel definition portion 610 away from the base plate 100.

In these optional embodiments, the isolation structure 200 is provided on the pixel definition portion 610, and the isolation structure 200 has a large height drop relative to the pixel opening 620. When the light-emitting layer 400 is manufactured, the light-emitting layer 400 is fractured more easily at a location of the isolation structure 200 due to a relatively large height drop, thereby reducing the difficulty in manufacturing the light-emitting layer 400.

In some optional embodiments, the pixel definition portion 610 is provided with an accommodation opening 630, and the isolation structure 200 is located in the accommodation opening 630.

In these optional embodiments, the isolation structure 200 is provided in the accommodation opening 630 on the pixel definition portion 610, and during the manufacturing process, a step for manufacturing the isolation structure 200 is before a step for manufacturing the pixel electrode 640, that is, the pixel electrode 640 is manufactured on the base plate 100 after the isolation structure 200 is manufactured on the base plate 100, so as to reduce an impact of manufacturing the isolation structure 200 on the pixel electrode 640 and ensure that the pixel electrode 640 is not damaged.

Optionally, orthographic projections of the touch electrode 311 and the virtual electrode 312 on the base plate 100 are located outside an orthographic projection of the pixel opening 620 on the base plate 100, and both the touch electrode 311 and the virtual electrode 312 are staggered with the pixel opening 620, so as to prevent the touch electrode 311 and the virtual electrode 312 from blocking the pixel opening 620, and ensure the normal light emission of the light-emitting unit 410.

In some optional embodiments, the display panel 10 further includes an encapsulation layer 700 located between the first electrode layer 500 and the touch layer 300.

In these optional embodiments, the encapsulation layer 700 is provided on a side of the first electrode layer 500 away from the base plate 100 to encapsulate the first electrode 510 and the light-emitting layer 400, thereby reducing the possibility of water-oxygen intrusion and increasing the service life of the display panel 10.

Optionally, the light-emitting layer 400 includes an electron inject layer (EIL), an electron transport layer (ETL), a light-emitting material layer, a hole inject layer (HIL), and a hole transport layer (HTL).

Embodiments of a second aspect of the present application provide a display panel 10 having a display region AA1 and a light transmission region AA2, and the display panel 10 further includes a base plate 100, an isolation structure 200, and a touch layer 300. The isolation structure 200 is located on a side of the base plate 100, and encloses and forms an isolation opening 240 and a light transmission opening 250, the isolation opening 240 is located in the display region AA1 and is provided with a light-emitting unit 410, and the light transmission opening 250 is located in the light transmission region AA2; and the touch layer 300 is located on a side of the isolation structure 200 away from the base plate 100 and includes a first conductive layer 310 and a second conductive layer 320 which are stacked, the first conductive layer 310 includes a touch electrode 311 and a virtual electrode 312 spaced apart and insulated from each other, and a plurality of virtual electrodes 312, at least one of the plurality of virtual electrodes 312 overlaps the light transmission region AA2, the second conductive layer 320 includes a first connection segment 321, and the plurality of virtual electrodes 312 are bridged through the first connection segment 312.

The display panel 10 according to the embodiments of the present application includes the base plate 100, the isolation structure 200, and the touch layer 300. The isolation structure 200 is provided on the base plate 100, and encloses and forms a plurality of isolation openings 240 configured to partition the light-emitting layer 400 to form partitioned light-emitting units 410, so that a crosstalk among carriers in the light-emitting layer 400 is reduced, a display effect of the display panel 10 is improved, and it is not necessary to use the fine mask when the light-emitting units 410 are manufactured, thereby reducing the development and use of the fine mask to reduce a manufacturing cost. The isolation structure 200 is provided with the light transmission opening 250, so that a light transmittance of the display panel 10 in the light transmission region AA2 can be improved. The touch layer 300 is located on a side of the isolation structure 200 away from the base plate 100 and includes the touch electrode 311 and the virtual electrode 312 spaced apart and insulated from each other, the touch electrode 311 is configured to achieve a touch function of the display panel 10, and the virtual electrode 312 and the touch electrode 311 are spaced apart and insulated from each other, that is, signals between the virtual electrode 312 and the touch electrode 311 are independent from each other. At least a part of the virtual electrode 312 is located in the light transmission region AA2, and a signal on the base plate 100 would cause interference to the virtual electrode 312 through the light transmission opening 250, but the touch electrode 311 and the virtual electrode 312 are insulated from each other, so that the touch electrode 311 is less interfered, and a touch performance of the touch electrode 311 is improved. The virtual electrodes 312 are electrically connected as a whole through the first connection segment 321, and after the plurality of first virtual electrodes 313 are connected to each other, only a single line is required to ground the first virtual electrodes 313 as a whole, thereby reducing the number of lines and simplifying the manufacturing process.

The structural designs in the embodiments may be applied to other display panels 10, and may be specifically selected according to actual situations, which is not specifically limited in the present application.

Figure 11:
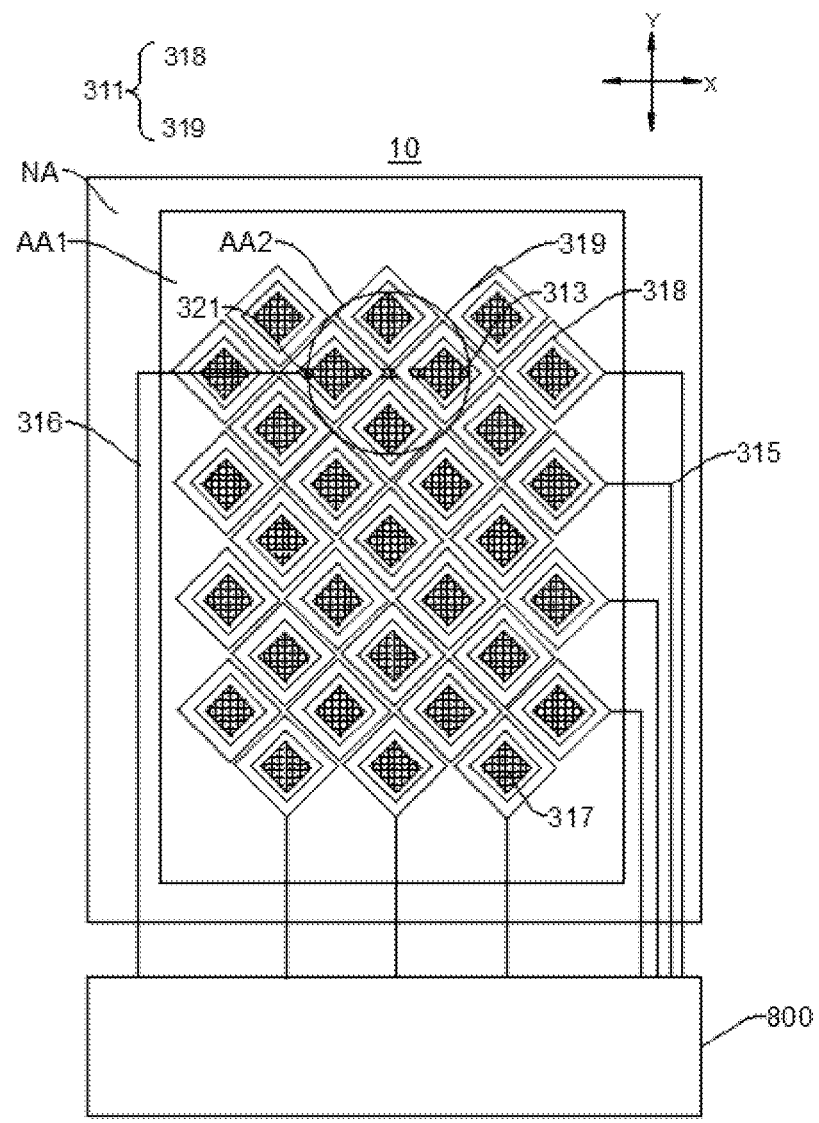
FIG. 11 is a schematic top view of a display apparatus according to an embodiment of the present application.

Referring to FIG. 11, FIG. 11 is a schematic top view of a display apparatus according to an embodiment of the present application.

As shown in FIG. 11, embodiments of a third aspect of the present application provide a display apparatus including the display panel 10 according to any of the above embodiments of the first aspect and the second aspect and an integrated circuit 800 (IC), the integrated circuit 800 is electrically connected to both the virtual electrode 312 and the touch electrode 311, and provides a low signal for the virtual electrode 312 and a touch signal for the touch electrode 311. Since the display apparatus according to the embodiments of the third aspect of the present application includes the display panel 10 according to any of the above embodiments of the first aspect and the second aspect, the display apparatus according to the embodiments of the third aspect of the present application has the beneficial effects of the display panel 10 according to any of the above embodiments of the first aspect and the second aspect, which is not repeated herein.

The display device according to the embodiments of the present application includes, but is not limited to a mobile phone, a personal digital assistant (PDA), a tablet computer, e-book, a television, an access control, a smart fixed phone, a console and other devices with a display function.

Embodiments of a fourth aspect of the present application provide a method for manufacturing a display panel 10 which may be any of the display panels 10 according to the above embodiments of the first aspect, and reference is made to FIG. 1 to FIG. 11. The display panel 10 has the display region AA1 and the light transmission region AA2, and the method includes:

manufacturing the isolation structure 200 on the base plate 100, wherein the isolation structure 200 encloses and forms an isolation opening 240 and a light transmission opening 250, the isolation opening 240 is located in the display region AA1 and is provided with a light-emitting unit 410, and the light transmission opening 250 is located in the light transmission region AA2; and manufacturing the touch layer on a side of the isolation structure 200 away from the base plate 100, wherein the touch layer 300 includes a first conductive layer 310 and a second conductive layer 320 which are stacked, the first conductive layer 310 includes a touch electrode 311 and a virtual electrode 312 spaced apart and insulated from each other, the virtual electrode 312 includes a first virtual electrode 313 at least partially located in the light transmission region AA2, the second conductive layer 320 includes a first connection segment 321, and the first virtual electrode 313 is connected to a blocking signal through the first connection segment 321.

In the manufacturing method according to the embodiments of the fourth aspect of the present application, the isolation structure 200 is manufactured on the base plate 100, wherein the isolation structure 200 is provided on the base plate 100, and encloses and forms a plurality of isolation openings 240 configured to partition the light-emitting layer 400 to form partitioned light-emitting units 410, so that a crosstalk among carriers in the light-emitting layer 400 is reduced, a display effect of the display panel 10 is improved, and it is not necessary to use the fine mask when the light-emitting units 410 are manufactured, thereby reducing the development and use of the fine mask to reduce a manufacturing cost. The isolation structure 200 is provided with the light transmission opening 250, so that the light transmittance of the display panel 10 can be increased. The touch layer is manufactured, wherein the touch layer 300 is located on a side of the isolation structure 200 away from the base plate 100 and includes the touch electrode 311 and the virtual electrode 312 spaced apart and insulated from each other, the touch electrode 311 is configured to achieve a touch function of the display panel 10, and the virtual electrode 312 and the touch electrode 311 are spaced apart and insulated from each other, that is, signals between the virtual electrode 312 and the touch electrode 311 are independent from each other. The virtual electrode 312 includes the first virtual electrode 313 at least partially located in the light transmission region AA2, and a data signal on the base plate 100 would cause interference to the first virtual electrode 313 through the light transmission opening 250, but the touch electrode 311 and the virtual electrode 312 are insulated from each other, so that the touch electrode 311 is less interfered, and a touch performance of the touch electrode 311 is improved. The virtual electrode 312 and the touch electrode 311 are located on the first conductive layer 310, the second conductive layer 320 includes the first connection segment 321, the first virtual electrode 313 is connected to the first connection segment 321 through a via and is connected to the blocking signal through the first connection segment 321, so that the first virtual electrode 313 has a fixed blocking signal. Under a condition that the first virtual electrode 313 is interfered by a signal from the light transmission opening 250, the potential of the first virtual electrode 313 is stable and is difficult to change, so that a problem that signal stability of the touch electrode 311 is affected as a result of mutually coupled touch signals of the touch electrodes 311 due to the potential change occurring after the first virtual electrode 313 is interfered may be reduced. That is, mutual interference between a data signal of the base plate 100 and the touch signal of the touch electrode 311 through the light transmission opening 250 is reduced, thereby improving the operational performance of the OLED display product.

The above embodiments of the present application do not exhaustively describe all the details, nor do they limit the present application to the specific embodiments as described. Obviously, according to the above description, many modifications and changes can be made. These embodiments are selected and particularly described in the specification to better explain the principles and practical applications of the present application, so that a person skilled in the art is able to utilize the present application and make modifications based on the present application. The present application is limited only by the claims and the full scope and equivalents of the claims.

What is claimed is:

1. A display panel, having a display region and a light transmission region, wherein the display panel further comprises:

a base plate;

an isolation structure located on a side of the base plate, wherein the isolation structure encloses and forms an isolation opening and a light transmission opening, the isolation opening is located in the display region and is provided with a light-emitting unit, and the light transmission opening is located in the light transmission region; and a touch layer located on a side of the isolation structure away from the base plate, wherein the touch layer comprises a first conductive layer and a second conductive layer which are stacked, the first conductive layer comprises a touch electrode and a virtual electrode spaced apart and insulated from each other, the virtual electrode comprises a first virtual electrode at least partially located in the light transmission region, the second conductive layer comprises a first connection segment, and the first virtual electrode is connected to a blocking signal through the first connection segment.

2. The display panel according to claim 1, wherein the display panel has a non-display region surrounding at least a part of the display region, and the display panel further comprises:

a blocking signal line, wherein at least a part of the blocking signal line is located in the non-display region, one terminal of the blocking signal line is connected to the first connection segment, and the other terminal is connected to the blocking signal;

or, at least one of first virtual electrodes is provided adjacent to the non-display region, one terminal of the blocking signal line is electrically connected to the first virtual electrode, and the other terminal is connected to the blocking signal.

3. The display panel according to claim 2, wherein the blocking signal line comprises a first line located on the first conductive layer, at least one of the first virtual electrodes is provided adjacent to the non-display region, one terminal of the first line is connected to the first virtual electrode, and the other terminal is connected to the blocking signal;

the blocking signal line comprises a second line located on the second conductive layer, one terminal of the second line is connected to the first connection segment, and the other terminal is connected to the blocking signal;

the blocking signal line is connected to a blocking signal of an integrated circuit;

the blocking signal comprises a fixed voltage signal; and the fixed voltage signal is a ground voltage signal.

4. The display panel according to claim 3, wherein the first conductive layer further comprises:

a touch line, wherein at least a part of the touch line is located in the non-display region, one terminal of the touch line is connected to the touch electrode, and the other terminal is connected to the integrated circuit; and the blocking signal line and the touch line are separated on two sides of the display region.

5. The display panel according to claim 1, wherein the first connection segment is connected to a plurality of first virtual electrodes in a same light transmission region, and/or the first connection segment is connected to first virtual electrodes located in a plurality of different light transmission regions.

6. The display panel according to claim 1, wherein a plurality of first virtual electrodes distributed along a first direction are bridged through the first connection segment; and/or the virtual electrode further comprises a second virtual electrode located in the display region, the first virtual electrode is bridged to the second virtual electrode through the first connection segment, and the second virtual electrode is electrically connected to the blocking signal;

the plurality of first virtual electrodes distributed along the first direction are located in a same row; and at least one of second virtual electrodes is in a same row as the first virtual electrodes along the first direction.

7. The display panel according to claim 6, wherein the touch electrode comprises a touch driving electrode and a touch sensing electrode, the second conductive layer comprises a second connection segment extending along the first direction, a plurality of touch sensing electrodes distributed along the first direction are bridged through the second connection segment, a plurality of touch driving electrodes distributed along a second direction are electrically connected to each other within the first conductive layer, and the first direction intersects the second direction.

8. The display panel according to claim 7, wherein the first conductive layer comprises a third connection segment extending along the second direction, the plurality of touch driving electrodes distributed along the second direction are electrically connected to each other through the third connection segment, and an orthographic projection of the first connection segment on the base plate overlaps an orthographic projection of the third connection segment on the base plate;

the touch electrode surrounds the virtual electrode; and the first virtual electrode is located within the touch sensing electrode.

9. The display panel according to claim 1, wherein orthographic projections of the touch electrode and the virtual electrode on the base plate are located outside an orthographic projection of the light transmission opening on the base plate.

10. The display panel according to claim 9, wherein at least a part of the orthographic projections of the touch electrode and the virtual electrode on the base plate is located within an orthographic projection of the isolation structure on the base plate.

11. The display panel according to claim 1, wherein the virtual electrode comprises a third virtual electrode located in the display region and provided in suspension; and one or more first virtual electrodes are located in a same light transmission region.

12. The display panel according to claim 1, wherein the display panel further comprises:

a light-emitting layer located on a side of the base plate and comprising the light-emitting unit located in the isolation opening; and a first electrode layer located on a side of the light-emitting layer away from the base plate; wherein the first electrode layer comprises a plurality of first electrodes provided at intervals, and the first electrode is electrically connected to the isolation structure;

an orthographic projection of each of light-emitting units on the base plate is located within an orthographic projection of a corresponding first electrode on the base plate; and the light-emitting unit is spaced apart from the isolation structure.

13. The display panel according to claim 1, wherein the isolation structure comprises a first layer and a second layer located on a side of the first layer away from the base plate, and an orthographic projection of the first layer on the base plate is located within an orthographic projection of the second layer on the base plate;

the second layer comprises a conductive material or an insulation material;

the second layer comprises a metal material, and materials of the first layer and the second layer are different; and the isolation structure further comprises a third layer located on a side of the first layer facing the base plate, and the orthographic projection of the first layer on the base plate is located within an orthographic projection of the third layer on the base plate.

14. The display panel according to claim 1, wherein the display panel further comprises:

a pixel definition layer located on the base plate, wherein the pixel definition layer comprises a pixel definition portion and a pixel opening enclosed and formed by the pixel definition portion, the light-emitting unit is located in the pixel opening, and the pixel opening is connected to the isolation opening;

the isolation structure is located on a side of the pixel definition portion away from the base plate; and the pixel definition portion is provided with an accommodation opening, and the isolation structure is located in the accommodation opening.

15. The display panel according to claim 14, wherein the display panel further comprises a pixel electrode, and the pixel electrode is exposed by the pixel opening; and orthographic projections of the touch electrode and the virtual electrode on the base plate are located outside an orthographic projection of the pixel opening on the base plate.

16. A display panel, having a display region and a light transmission region, wherein the display panel further comprises:

a base plate;

an isolation structure located on a side of the base plate, wherein the isolation structure encloses and forms an isolation opening and a light transmission opening, the isolation opening is located in the display region and is provided with a light-emitting unit, and the light transmission opening is located in the light transmission region; and a touch layer located on a side of the isolation structure away from the base plate, wherein the touch layer comprises a first conductive layer and a second conductive layer which are stacked, the first conductive layer comprises a touch electrode and a virtual electrode spaced apart and insulated from each other, and wherein the first conductive layer comprises a plurality of virtual electrodes, at least one of the plurality of virtual electrodes overlaps the light transmission region, the second conductive layer comprises a first connection segment, and the plurality of virtual electrodes are bridged through the first connection segment.

17. The display panel according to claim 16, wherein the plurality of virtual electrodes comprise a first virtual electrode located at least partially in the light transmission region and a second virtual electrode located in the display region, and the first virtual electrode and the second virtual electrode are bridged through the first connection segment;

or, the plurality of virtual electrodes comprise a plurality of first virtual electrodes, at least a part of each of the first virtual electrodes is located in the light transmission region, and the plurality of first virtual electrodes are bridged through the first connection segment.

18. The display panel according to claim 16, wherein the touch electrode comprises touch sensing electrodes arranged along a first direction and touch driving electrodes arranged along a second direction, the plurality of virtual electrodes bridged through the first connection segment are arranged along the first direction, and the first direction intersects the second direction.

19. The display panel according to claim 18, wherein the plurality of virtual electrodes bridged through the first connection segment are respectively located within the touch sensing electrodes; and the second conductive layer comprises a second connection segment extending along the first direction, the touch sensing electrodes distributed along the first direction are bridged through the second connection segment, the touch driving electrodes distributed along the second direction are electrically connected to each other within the first conductive layer.

20. A display apparatus, comprising the display panel according to claim 1 and an integrated circuit located in a non-display region, wherein the integrated circuit is electrically connected to both the first virtual electrode and the touch electrode.

* * * * *